(12) United States Patent
Wouhaybi et al.

(10) Patent No.: US 8,250,639 B2
(45) Date of Patent: Aug. 21, 2012

(54) MICRO AND MACRO TRUST IN A DECENTRALIZED ENVIRONMENT

(75) Inventors: Rita H. Wouhaybi, Hillsboro, OR (US); John Vicente, Roseville, CA (US); Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 11/943,519

(22) Filed: Nov. 20, 2007

(65) Prior Publication Data

US 2009/0133096 A1 May 21, 2009

(51) Int. Cl.
*H04L 29/06* (2006.01)
*G06F 7/04* (2006.01)
*G06F 15/16* (2006.01)
*G06F 1/30* (2006.01)
*G06F 11/00* (2006.01)
*G06F 12/14* (2006.01)

(52) U.S. Cl. .............. 726/10; 726/21; 726/22; 713/156; 713/168; 713/176; 713/189; 713/193

(58) Field of Classification Search ........................ None
See application file for complete search history.

(56) References Cited

U.S. PATENT DOCUMENTS

| | | | |
|---|---|---|---|
| 6,119,232 A * | 9/2000 | Duncan ........................... | 726/21 |
| 7,155,738 B2 | 12/2006 | Zhu et al. | |
| 7,467,409 B2 * | 12/2008 | Reasor et al. ................... | 726/22 |
| 2002/0026576 A1 * | 2/2002 | Das-Purkayastha et al. . | 713/156 |
| 2002/0188763 A1 * | 12/2002 | Griffin .......................... | 709/310 |
| 2003/0163719 A1 * | 8/2003 | Ebihara ......................... | 713/193 |
| 2004/0187031 A1 | 9/2004 | Liddle | |
| 2005/0256866 A1 | 11/2005 | Lu et al. | |
| 2006/0020792 A1 * | 1/2006 | Weiss ............................. | 713/168 |
| 2006/0212931 A1 * | 9/2006 | Shull et al. ....................... | 726/10 |
| 2006/0294134 A1 | 12/2006 | Berkhim et al. | |
| 2007/0011236 A1 | 1/2007 | Ravula | |
| 2007/0136178 A1 | 6/2007 | Wiseman et al. | |
| 2007/0143629 A1 * | 6/2007 | Hardjono et al. ............. | 713/189 |
| 2007/0192498 A1 * | 8/2007 | Dini et al. ...................... | 709/228 |
| 2007/0208613 A1 | 9/2007 | Backer | |
| 2007/0260520 A1 | 11/2007 | Jha et al. | |
| 2007/0271462 A1 * | 11/2007 | Bleckmann et al. .......... | 713/176 |
| 2008/0133747 A1 | 6/2008 | Fish | |
| 2009/0064293 A1 | 3/2009 | Li et al. | |

FOREIGN PATENT DOCUMENTS

| JP | 2003-132220 A | 5/2003 |
|---|---|---|
| JP | 2005-166007 A | 6/2005 |

OTHER PUBLICATIONS

U.S. Appl. No. 11/850,542, filed Sep. 5, 2007; 26 pages.
D. J. Watts and S. H. Strogatz. "Collective dynamics of 'small-world' networks." Nature 393, 440-442, 1998. 3 pages.
A.-L. Barabási and R. Albert. "Emergence of scaling in random networks," Science 286, 509-512, 1999. 4 pages.

* cited by examiner

*Primary Examiner* — Shin-Hon Chen
(74) *Attorney, Agent, or Firm* — Barnes & Thornburg, LLP

(57) ABSTRACT

A method and system are disclosed. In one embodiment the method includes calculating a trust level of a first entity. The first entity has a plurality of components. Each component in the first entity has at least the trust level of the first entity.

9 Claims, 3 Drawing Sheets

MICRO AND MACRO TRUST IN A DECENTRALIZED ENVIRONMENT

FIELD OF THE INVENTION

The invention relates to trust relationships between components in a decentralized network.

BACKGROUND OF THE INVENTION

Trust and other services and applications that benefit from trust, such as authentication and authorization, do not explicitly define trust. As a result, systems often implement one of two different approaches to deal with trust. On one end, components and applications replicate and maintain separate trust levels while, on the other end of the spectrum, individual components trust other components completely, implicitly or explicitly, thus increasing their vulnerability and compromising their security when the other component they trusted is compromised.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method and system to manage micro and macro trust in a decentralized environment are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
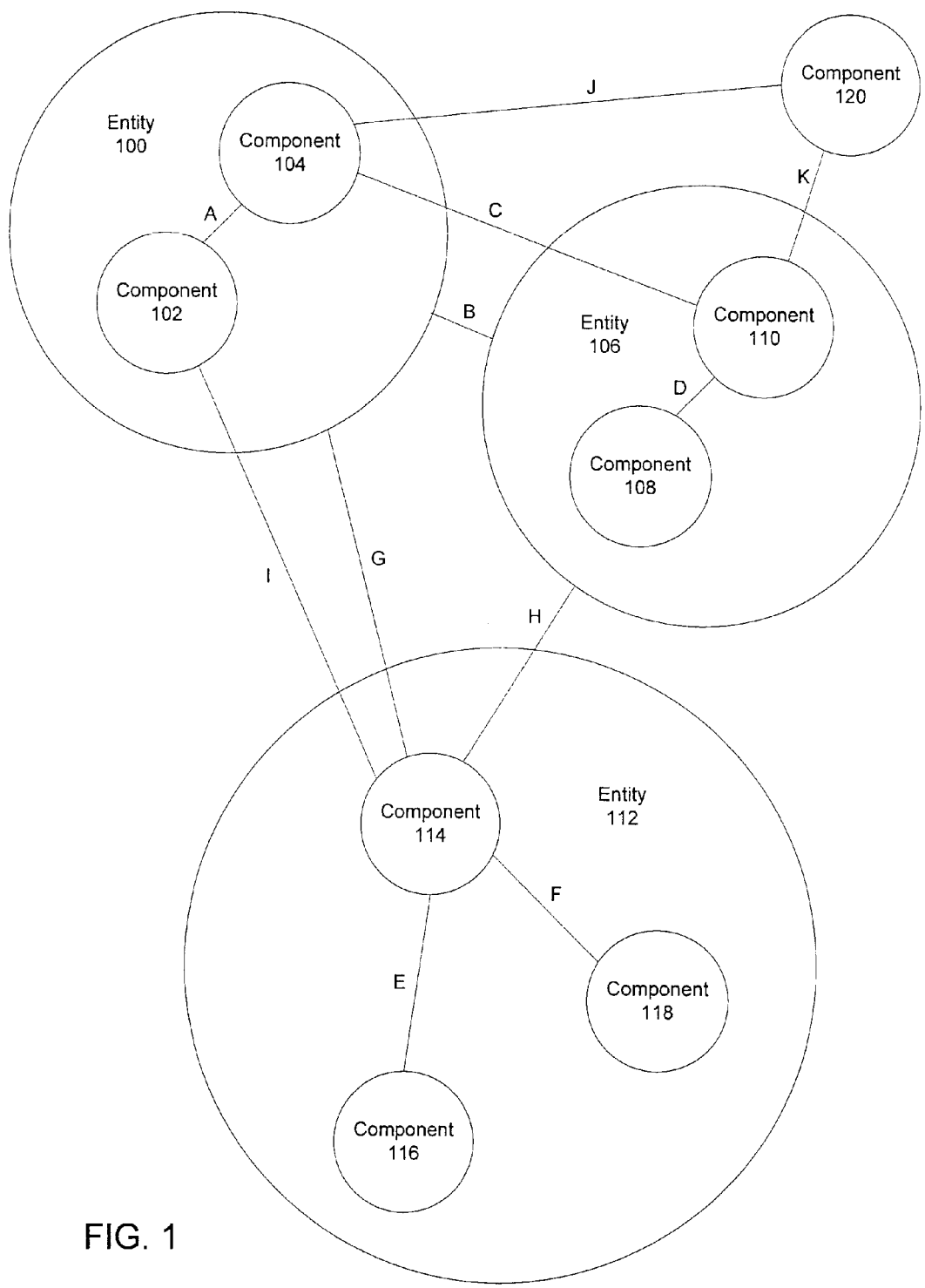
FIG. 1 describes one embodiment of a social network trust system of interaction including several components and entities.

FIG. 1 describes one embodiment of a social network trust system of interaction including several components and entities. In many embodiments, the system includes multiple entities as well as the multiple components. Any given entity can be made up of one or more components within the system. For example, a component may be a computer device, an operating system running on the computer device, a virtual machine running on the computer device, a software application running on the computer device, a human user of the computer device, among other things. An entity may be comprised of any combination of the devices listed above (i.e. the computer device, application, operating system virtual machine, and user may comprise a single entity). In other embodiments, one entity may comprise two or more other entities. Thus, certain entities can be made up of just components, other entities, or a combination of components and entities. Although an entity can technically be made up of a single component, in many embodiments it is simple to assume that entities comprise multiple components, multiple component and entity combinations, or multiple other entities.

In many embodiments, the existence of a trust level between any two components, between any two entities, or between a component and entity is shown by a straight dotted line connecting the two. A trust level that a first node (a node is defined as a component or entity) has for a second node defines the relative certainty the first node has that the second node will not attack the first node's security. A trust level may also be a positive or negative value.

For example, if a second node attacks a first node willfully the trust level the first node has for the second node may be a significant negative value. On the contrary, if a first node has a great deal of contact with a second node, and the second node has always interacted perfectly with the first node, the first node may have a significant positive value. Furthermore, in some embodiments, if a first node and second node have never had contact with each other, the first node may have a neutral trust level for the second node. On the other hand, in an environment where there is inherent trust for nodes with no prior contact, a first node may have a small positive trust level for an initial interaction with a second node. Additionally, in many embodiments, trust levels may propagate through nodes. Thus, a first node that has no prior contact with a second node, might ask a third node that the first node has a trust level with about the second node. If the third node has a positive trust level with the second node, that positive trust level may propagate through to the first node.

In some embodiments, the trust level a first node has for a second node does not need to be positive for the first node to ask the second node for information on a third node. The only caveat being that if the first node has a negative trust level regarding the second node it may not trust the information the second node provides it as much as it would if the first node did have a positive trust level regarding the second node.

Propagation can take place using any number of different rules. For example, a first component has trust level X with a second component, and the second component has trust level Y with a third component. When the first component wants to initiate a trust level with the third component, it asks the second component what trust level the second component has with the third component. In some embodiments, if trust level X is higher than trust level Y (i.e. the first component trusts the second component more than the second component trusts the third component), then trust level Y propagates to the first component as its new trust level with the third component. In other embodiments, if trust level Y is higher than trust level X, then the first component utilizes trust level X as its new trust level with the third component, or any combination of both trust levels that the first component deems appropriate. Many different types of propagation rules may be utilized in different embodiments.

The creation of an entity may be for the benefit of the components within the entity in some embodiments. In other embodiments, the benefit may be for one or more external components and/or external entities ("external" refers to a component and/or entity that is not located in the original entity and/or component in question). For example, in certain embodiments, in order to limit the number of direct trust relationships in a larger system, a group of components can form an entity to utilize a hub node and/or a super-component node and propagate trust through that particular node. In other cases, the components, with high trust levels among themselves, form a new entity, thus simplifying the exchange of trust levels with other external components and entities.

In many embodiments, it is not necessary that all components within an entity have direct trust relationships with each other. Though, in some embodiments, any single component within an entity will be able to inquire about the trust level of any other component in the entity through the trust propagation concept. Thus, in these embodiments, any one component in an entity has a trust path (either direct or through propagation) to all other entities in the component.

A super-component is a component within an entity that stores the trust levels of all (or many) of the external entities (and their respective external components) that have one or more trust relationships with the entity that contains the super-component and/or components within the entity that contains the super-component. In many embodiments that utilize super-components, one or more additional components within the entity that the super-component is located within may ask the super-component for its trust level of an external entity or component. In some embodiments, once the additional component(s) receive the super-component's trust level of the external component or entity, the additional component(s) will adopt the same level of trust that the super-component utilizes.

In other embodiments, the additional component(s) may utilize the super-component's level of trust of the external entity or component in its calculation of its own trust level of the external entity or component, but will not necessarily just adopt the same trust level that is stored by the super-component.

In many embodiments, the trust levels between components and entities are determined based on a social network model of interaction. In a social network, individual components tend to have a high clustering coefficient (i.e. many interconnectivities) and a low-diameter (i.e. short distance). A group of components (such as an entity) likely is interconnected in a community-like fashion. In addition, certain communities can inter-connect though hubs. Thus, in many embodiments, hubs are implemented within entities.

In embodiments with hubs, it is possible that only the super-component/hub components within an entity may interface with other external components and/or external entities. This allows the super-component/hub to take trust level requests regarding external components and/or entities from other components within the entity the super-component is a part of. The super-component can propagate its trust level information to the requesting component(s). This also allows the super-component to send trust level information to external components and/or entities which tender requests to the super-component regarding other components in the entity the super-component is a part of (or a request regarding the trust level of the entity itself). Hubs acts as propagation points rather than authorities. Communities can also be connected through more than one hub.

In many embodiments, the network that includes components and hubs operates in a decentralized, distributed mode of operation. In a distributed network, each component may store and account for information relating to its own trust relationships with other components/entities and/or store and account for information relating to trust relationships that affect entities it is incorporated within.

In some embodiments, a first component may deal with a number of other components that have something in common, such as all components are located behind a firewall in a single business. In this example, it's possible that the first component will create an entity that incorporates all components behind the business firewall. In this way, instead of keeping separate trust relationships with each of the components at the business, one business-wide entity is formed to allow for a general trust level to be ubiquitous throughout the business components, and the containment of such a restricted environment.

In many embodiments, an entity may be able to integrate a new component, though there may be minimum trust level requirements associated with the integration. For example, there may be a requirement that in order for a new component to be integrated into an entity, each of the entity components that have a previous trust relationship established with the proposed new component must have a minimum trust level associated with the previously established trust relationship regarding the new component. Thus, in these embodiments, a component may be allowed to be integrated into the entity if its pre-established trust relationships with components within the entity are at least equal to the entity base trust level. In other embodiments, a component may be allowed to be integrated into the entity if its pre-established trust relationships with components within the entity are comparable to a minimum trust level the first entity requires. This minimum trust level may be calculated in many ways. For example, the minimum trust level may be predetermined. In another example, the minimum trust level may be a function of the trust levels each of the components within the entity have with each of the other components within the entity where trust relationships exist. In many other embodiments there are many other ways of calculating a minimum trust level and different entities may calculate it differently.

In many embodiments, if a new component is attempting to be integrated into a first entity, a calculation of the trust level of the first component may include both trust information that deals with one or more trust relationships the new component has with one or more components within the first entity as well as trust information that deals with one or more trust relationships the new component has with one or more components external to the first entity. The final calculation of the trust level may incorporate all of this gathered trust information.

FIG. 1 illustrates a cross-section of some of the possible trust relationships between components and entities. In FIG. 1, entity 100 includes component 102 and component 104. Component 102 and component 104 have a trust relationship A (represented by the dotted line). Entity 106 includes component 108 and component 110, which have trust relationship D between them. Entity 100 and entity 106 have a trust relationship B. This creates the possibility that any component within entity 100 having a base entity trust level for any component within entity 106 and vice versa.

In the embodiments where base entity trust levels exist for all components within these two entities, a given component within an entity may store trust relationship information for its entity. For example, component 102, on top of storing information related to trust relationship A, also stores information related to trust relationship B and trust relationship G.

Additionally, component 104 within entity 100 has a direct trust relationship C with component 110 within entity 106. In some embodiments, trust relationship C may be a higher value than trust relationship B. In other embodiments (not shown), entity 100 and entity 106 may not have trust relationship B, but, in these embodiments, components 104 and 110 may still have trust relationship C.

Entity 112 includes component 114, component 116, and component 118. In the example described in FIG. 1, component 114 has a trust relationship with each of the other two components in entity 112, component 116 and component 118 (trust relationships E and F respectively). Component 114 also has a trust relationship with entity 100 and entity 106 (trust relationships G and H respectively). In many embodiments, component 114 is a super-component for entity 112.

A super-component is a component within an entity that stores the trust levels of all (or many) of the external entities (and their respective external components) that have one or more trust relationships with the entity that contains the super-component and/or components within the entity that contains the super-component. In many embodiments that utilize super-components, one or more additional components within the entity that the super-component is located within may ask the super-component for its trust level of an external entity or component. In some embodiments, once the additional component(s) receive the super-component's trust level of the external component or entity, the additional component(s) may adopt the same level of trust that the super-component utilizes. In other embodiments, the additional component(s) may utilize the super-component's level of trust of the external entity or component in its calculation of its own trust level of the external entity or component, but will not necessarily just adopt the same trust level that is stored by the super-component. In other embodiments that do not include a super-component, each component that desires to maintain one or more trust levels with other external entities and components may be required to manage its own storage of trust levels.

As mentioned, the storage of trust levels associated with the trust relationships between a first node (as mentioned above, a node may be an entity or component within an entity) and second node may be located within the respective nodes that have the trust relationships. Thus, in many embodiments, a component, such as component 114, may have a stored trust level associated with an external entity, such as entity 100, as well as the information that details the list of components comprising the external entity. In some embodiments, when a component interfaces with an entity for the first time, the interfacing component is sent the list of components that comprise the entity. Thus, once the component computes a trust level of the entity, that computed trust level may be established as the entity base trust level for all components included on the list (in this example for entity 100 the list may include components 102 and 104).

In some embodiments, a first component, such as component 114, may have a trust relationship with an external entity, such as entity 100, as well as a trust relationship with one or more components within the external entity. In the embodiment shown in FIG. 1, component 114 also has a trust relationship I with component 102 within entity 100. In many embodiments, component 114 has at least an entity base trust level for any component within entity 100.

Apart from the entity 100 base trust level, component 114 may have a separate higher trust level for component 102. For example, if component 114 has trust level X with entity 100, then component 114 would have at least trust level X with every component within entity 100 (components 102 and 104 in this example). Due to the additional direct trust relationship I between component 114 and component 102, component 114 may additionally have a higher trust level for component 102 than the entity 100 base trust level.

Furthermore, through trust level propagation, component 114 may also have a higher trust level with component 104 than the entity 100 base trust level. Though, in this last case, it is likely that if component 114 has individual trust levels with all components within entity 100 that are higher than the entity 100 base trust level, that this would trigger component 114 to recalculate (i.e. readjust) it's entity 100 base trust level higher to match at least the lowest trust level that component 114 has with any individual component within entity 100. Thus, where a higher trust level number is better, if component 114 has a base entity trust level of "2" for entity 100 and a trust level of "3" with components 102 and 104 within entity 100, component 114 may decide to readjust the base entity trust level for entity 100 up to "3" to coincide with the individual component trust levels within entity 100. On the other hand, if component 114 has a base entity trust level of "3" for entity 100, an individual component trust level of "4" for component 102, but the individual component trust level for component 104 falls to "2," then component 114 may readjust the base entity trust level for entity 100 down to "2" to coincide with the lowered trust level for component 104.

In other embodiments, the trust level an external component has with an entity may be equal to the highest individual trust the external component has with any single component within the entity. In yet other embodiments, the trust level the external component has with the entity may be a function of the trust levels the external component has with all the components within the entity (e.g. such as a weighted average trust level, a median trust level, etc.).

The changing of a trust level value of a component or entity may be the result of any of a number of events such as an attack from the component or entity, an attack on the component or entity, a length of time that has passed between interactions with the component or entity, or any one of many other possible events. It is also possible that if a component within an entity is compromised greatly in some way where its trust level falls below that of the base entity trust level, the compromised component may be removed from the entity (so as not to adversely affect the base entity trust level as a whole). In addition, if communication among entities and components is happening smoothly, then trust levels are updated positively.

Hubs may be similar to super-components within networks, such that a super-component, like component 114, is the hub connector that allows components 116 and 118 to interact with other groups of components (e.g. components within entities 100 and 106).

In the social network model, any component may inquire with other known components and/or entities to see what type of reputation a new component may have. For example, component 114 may desire to interact with component 120 without any prior direct interaction. Component 114, although never having prior direct interaction with component 120, has had prior direct interaction with components 104 and 110 (which are in entities 100 and 106 respectively). Component 114 has a trust relationship with components 104 and 110 through its respective entity trust relationships (trust relationships G and H respectively). Thus, component 114 may ask components 104 and 110 what their trust relationships with component 120 (trust relationships J and K). Based on the response received, component 114 may have a better idea regarding its own trust level in component 120.

Also, in the social network model, any component may also warn any other component about the reputation of a third component or entity. For example, component 114 has a trust relationship H with entity 106 and a trust relationship G with entity 100. Entity 100 also has a trust relationship B with entity 106. In one example scenario, a component within entity 106 attacks component 102 within entity 100. In this scenario, component 102 may proactively warn component 114 about this attack. Component 114, receiving this warning, may then lower the trust level associated with its trust relationship H with entity 106. Alternatively, component 102 may remain passive regarding the attack, but component 114 may subsequently inquire for an update of trust relationship B between entity 100 and 106 with component 102, and subsequently find out that the trust level has decreased. As a result, component 114 may then lower its trust level associated with trust relationship H.

Figure 2:
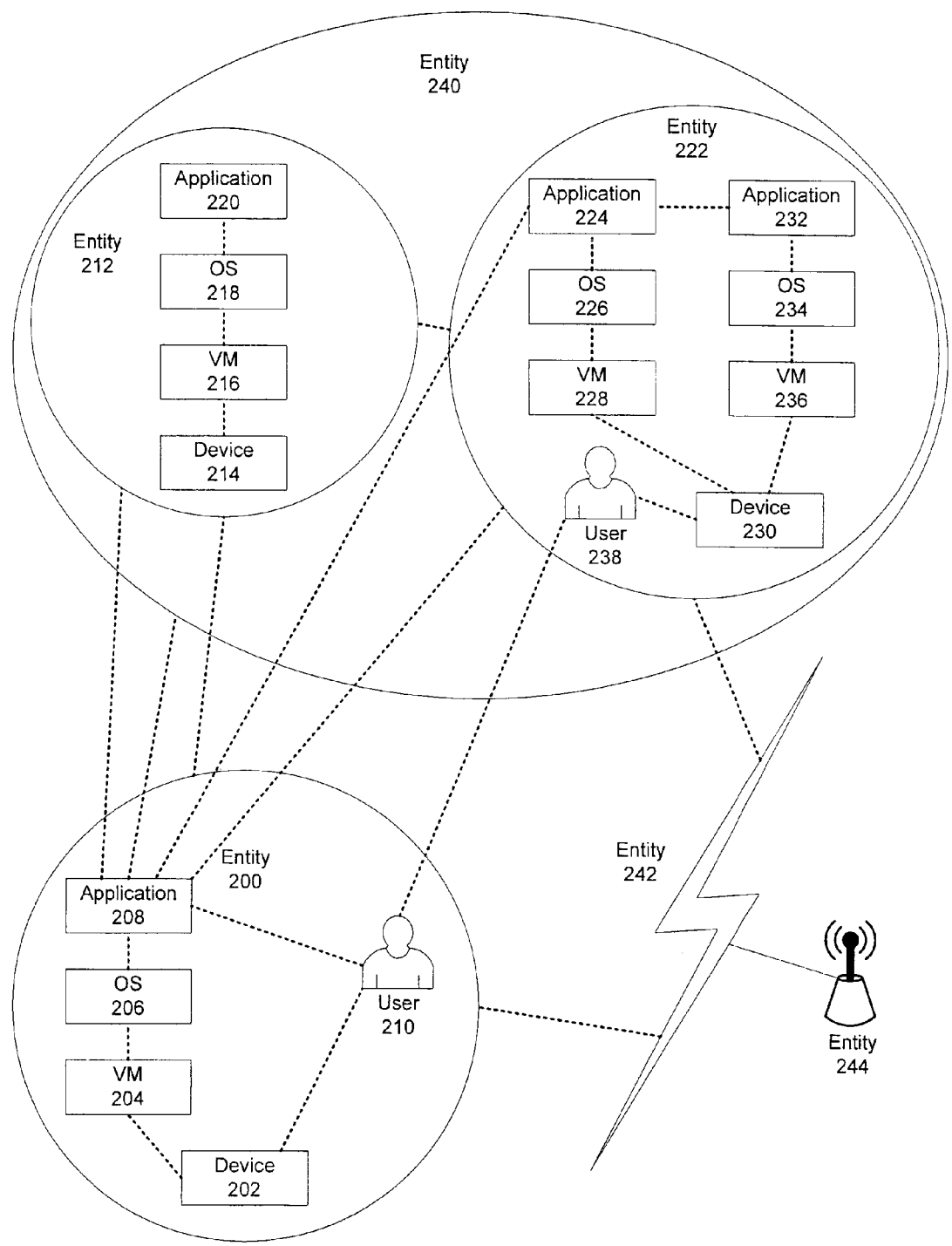
FIG. 2 describes a real-world example embodiment of a social network trust system of interaction between components and entities.

FIG. 2 describes a real-world example embodiment of a social network trust system of interaction between components and entities. In FIG. 2, entity 200 includes a physical device 202, virtual machine (VM) 204, operating system (OS) 206, application 208, and user 210. In different embodiments, entity 200 comprises a desktop computer and user, a mobile computer and user, or any other type of computer or other computing device and user. In the example shown in FIG. 2, entity 200 has a trust relationship with entity 212. Additionally, in many embodiments, application 208 is a hub-component. Thus, application 208, in the embodiments where it comprises a hub-component, has a trust relationship with entity 212, entity 222, and entity 240. So, for example, if OS 206 within entity 200 desires to interact with device 214 within entity 212, OS 206 may ask application 208 its trust level of the trust relationship between itself and entity 212, and based on the propagation rules in place, OS 206 may calculate its own trust level with entity 212 (and device 214 within entity 212) based on the information it receives from application 208. In this embodiment, OS 206 is given authority to calculate its own trust level for entity 212. In other embodiments, a hub-component may be a super-component and has authority to dictate the trust level that other components within the super-component's entity have with external entities and components.

Additionally in FIG. 2, entity 212 may be comprised of device 214, VM 216, OS 218, and application 220. In some embodiments, entity 212 comprises a router device. A router device or other such similar devices do not necessarily have one or more associated users since they are capable of operating autonomously. Furthermore, entity 222, in many embodiments, includes multiple applications, OS's, and VM's. In some embodiments, entity 222 includes a first application 224. In some embodiments, application 224 is a web server. Web server application 224 has a trust relationship with OS 226, which in turn has a trust relationship with VM 228. VM 228 has a trust relationship with device 230. In many embodiments, application 232 is a database backend that has a trust relationship with web server application 224. Database backend application 232 also has a trust relationship with OS 234, which in turn has a trust relationship with VM 236. VM 236 also has a trust relationship with device 230. Thus, device 230 has multiple hardware partitions in many embodiments. User 238 has a trust relationship with device 230. Thus, server entity 222 runs both the web server application and the database backend application on two different partitions.

Web server application 222 may have a direct trust relationship with one or more external components not associated with entity 222, in some embodiments. For example, web server application 224 may have a direct trust relationship with application 208 in entity 200. In these embodiments, application 208 may be a web browser application. Furthermore user 238 may be a database administrator in some embodiments. In some embodiments, user 210 is an end user at a desktop or mobile client station that may comprise entity 200. In some embodiments, user 210 and user 238 may have a human interaction between each other and therefore have their own trust relationship. In these embodiments, it is possible that user 238 provide device 230 (as well as the entire entity 222) with additional trust information regarding user 210. Thus, user 210 and the client device (and entire entity) that user 210 is located within may receive a higher trust level than a random user and random entity if user 238 manually modifies the trust level entity 222 has with application 208 (or any other components or the entire entity).

In many embodiments, multiple entities can be incorporated into larger entities such as entities 212 and 222 being incorporated into entity 240. These embodiments where entities are combined into larger entities may include similar benefits as described above relating to multiple components being incorporated into a single entity. In many embodiments, the base entity trust level of the new larger entity may be the lesser of the base entity trust levels of the original smaller entities.

In many embodiments, entities can also constitute wireless network domains, such as entity 242, or wireless access points such as entity 244. In environments where wireless networks are utilized to create trust relationships between components and entities, the trust relationships can be dynamic as a wireless device moves in and out of network coverage. Thus, in many embodiments, the trust relationships change over time based on locations that the wireless device enters and exits.

Figure 3:
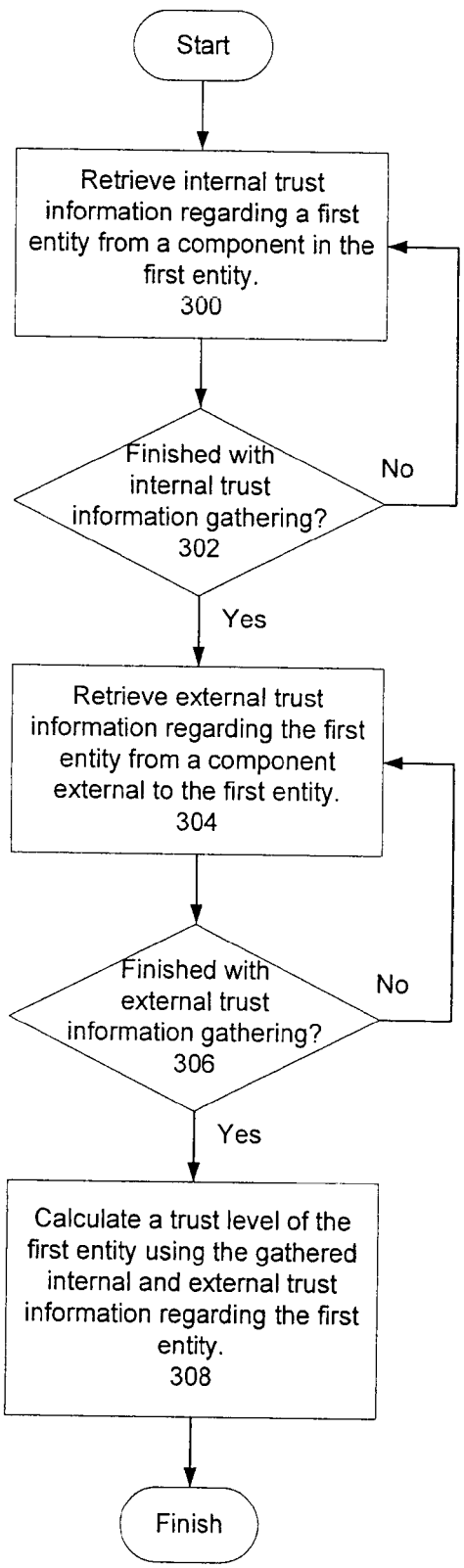
FIG. 3 is a flow diagram of one embodiment of a process to calculate the trust level of an entity.

FIG. 3 is a flow diagram of one embodiment of a process to calculate the trust level of an entity. The process may be performed by hardware, software, or a combination of both. The process begins by processing logic retrieving internal trust information regarding a first entity from a component in the first entity (processing block 300).

Next, processing logic determines whether all internal trust information regarding the first entity has been gathered (processing block 302). If not, then processing logic returns to processing block 300 and retrieves trust information regarding the first entity from another component in the first entity.

Otherwise, if all internal trust information regarding the first entity has been gathered, then processing logic retrieves external trust information regarding the first entity from a component external to the first entity (processing block 304). Next, processing logic determines whether all external trust information regarding the first entity has been gathered (processing block 306). If not, then processing logic returns to processing block 304 and retrieves trust information regarding the first entity from another component external to the first entity.

If all external trust information has been gathered, then processing logic calculates a trust level of the first entity using the gathered internal and external trust information regarding the first entity (processing block 308) and the process is finished.

In some embodiments, there is only internal trust information gathered. In other embodiments, there is only external trust information gathered. In yet other embodiments, there is no trust information to gather (such as when a new component enters a distributed network for the first time). Though, these embodiments are not shown in FIG. 3.

Thus, embodiments of a method and system to manage micro and macro trust in a decentralized environment are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   determining, on a first computing device entity, a first trust level between the first computing device entity and a second computing device entity;
   determining, on the first computing device, a second trust level between a first component of the first computing device entity and a second component of the second computing device entity;

calculating, on the first computing device, a third trust level between a third component of the first computing device entity and the second component of the second computing entity as a function of the first trust level and the second trust level;

wherein the third trust level is utilized, at least in part, by the third component of the first computing device entity in determining whether to communicate with the second component of the second computing device entity.

2. The method of claim 1, wherein the first trust level is a function of, at least in part, a length of time the first computing device entity has had knowledge of the second computing device entity.

3. The method of claim 1, wherein the first trust level is a function of, at least in part, a length of time since the first computing device entity has last been in communication with the second computing device entity.

4. The method of claim 1, wherein the second trust level is greater than the first trust level.

5. The method of claim 1, wherein the second computing device entity comprises a plurality of components and further comprising:

establishing a trust level between the first component of the first computing device entity and each of the plurality of components of the second computing device, wherein each of the trust levels between the first component of the first computing device entity and each of the plurality of components of the second computing device is no less than the first trust level.

6. The method of claim 1, further comprising determining, on the first computing device, a fourth trust level between the third component of the first computing device and the first component of the first computing device, wherein calculating the third trust level comprises calculating the third trust level as a function of the first trust level, the second trust level, and the fourth trust level.

7. A method, comprising:

determining, on a first computing device entity, a first trust level between the first computing device entity and a second computing device entity;

determining, on the first computing device, a second trust level between a first component of the first computing device entity and a second component of the second computing device entity;

determining, on the first computing device, a third trust level between a third component of the first computing device entity and the first component of the first computing device entity; and calculating, on the first computing device, a fourth trust level between a third component of the first computing device entity and the second component of the second computing entity as a function of the first trust level, the second trust level, and the third trust level.

8. A method, comprising:

determining, on a first computing device entity, a first trust level between a first component of a plurality of components of the first computing device entity and a second computing device entity;

receiving, on the first computing device, a second trust level between a second component of a plurality of components of the second computing device entity and a third component of a third computing device entity; and calculating, on the first computing device, a third trust level between a fourth component of the first computing device entity and the third component of the third computing entity as a function of the first trust level and the second trust level.

9. The method of claim 8, further comprising determining, on the first computing device, a fourth trust level between the fourth component of the first computing device and the first component of the first computing device, wherein calculating the third trust level comprises calculating the third trust level as a function of the first trust level, the second trust level, and the fourth trust level.

\* \* \* \* \*